C. S. LOCKWOOD.
DOUBLE THRUST BEARING.
APPLICATION FILED NOV. 14, 1916.
1,226,345.  Patented May 15, 1917.
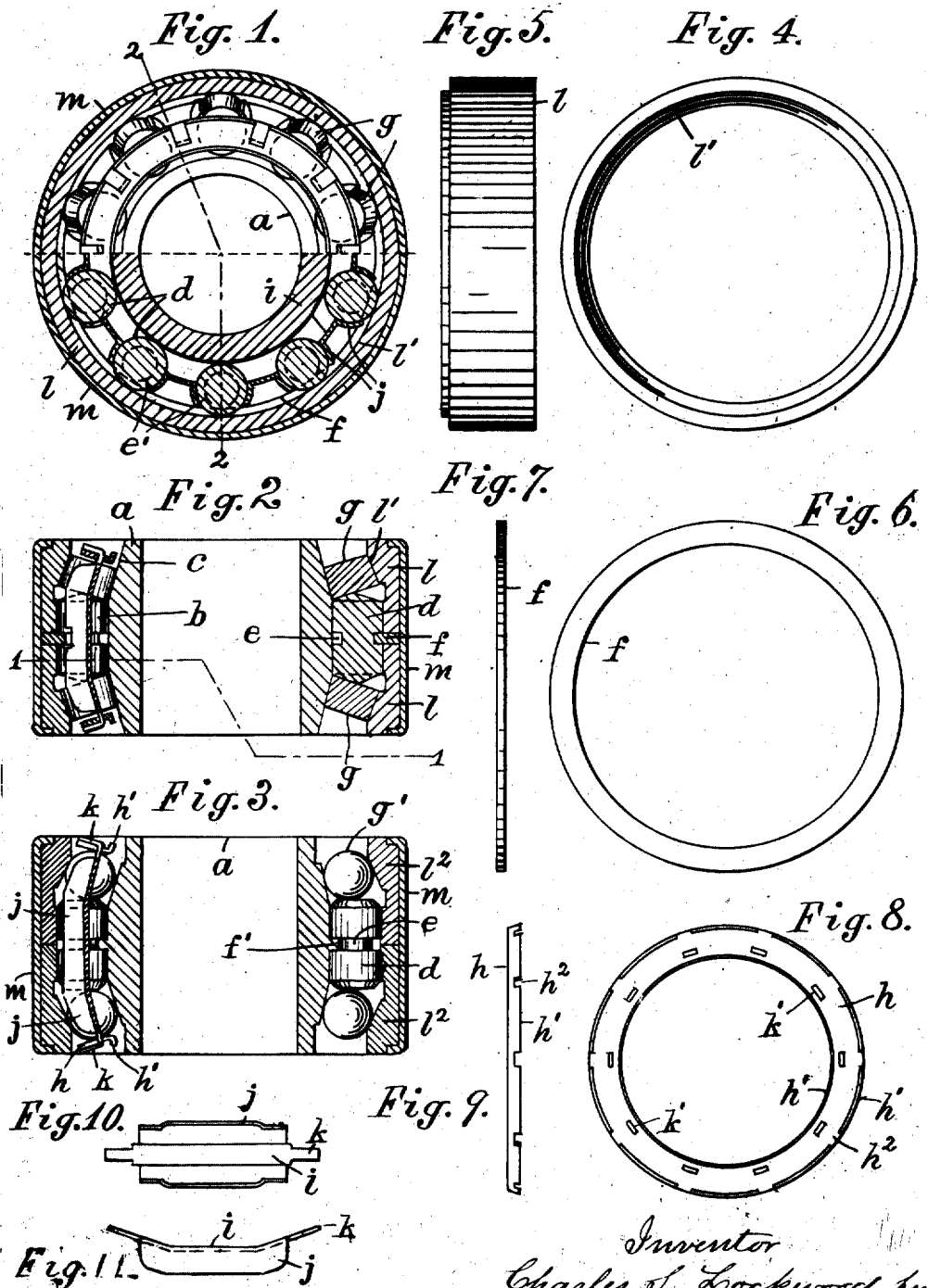

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

DOUBLE-THRUST BEARING.

1,226,345.   Specification of Letters Patent.   Patented May 15, 1917.

Application filed November 14, 1916. Serial No. 131,217.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Double-Thrust Bearings, fully described and represented in the following specification and the accompanying drawings, forming a part of the same.

This invention relates to a roller bearing in which the hub and casing have each a cylindrical seat for cylindrical rolls and a tapering seat for rolling members which roll in contact with the ends of the cylindrical rolls, and the invention provides means for constructing such a bearing to resist end thrust in both directions, with special constructive features to facilitate the assembling of the parts and guiding the rolls steadily in their rotations.

The construction embodying this invention embraces broadly a hub having a cylindrical seat with conical seats connected to its opposite ends, cylindrical rolls fitted to the cylindrical seat and having means to prevent longitudinal movement of those rolls, rolling members bearing upon the conical seat and rolling in contact with the opposite ends of the cylindrical rolls, and a casing having cylindrical and conical seats fitted to the outer sides of the rolls and bearing members.

The cylindrical rolls are prevented from longitudinal movement by forming a groove upon the body of each intermediate to its ends, and providing the hub or casing with an annular rib engaging such groove which holds the rolls from longitudinal movement upon their cylindrical seats.

To assemble the rolling members within the casing it is preferably divided into at least two annular sections each having one of the tapering seats and capable of being slipped over the rolling members when they are assembled upon the hub within the cage, such sections being then bound together permanently by a shell fitted to the exterior of the sections, and having its ends spun or turned down over the outer ends of the sections.

The invention will be understood by reference to the annexed drawing, in which

Figure 1 is a transverse section on line 1—1 in Fig. 2; Fig. 2 is a longitudinal section on line 2—2 in Fig. 1; with the entire casing in section, where the line intersects the same.

Fig. 3 is a section similar to Fig. 2, with balls employed as rolling members upon the conical seats, and the rolls and balls not in section.

Fig. 4 is an end view, and Fig. 5 an edge view of one of the end sections of the casing. Fig. 6 is an end view, and Fig. 7 an edge view of the center section of the casing. Fig. 8 is an end view, and Fig. 9 an edge view of one of the cage-heads. Fig. 10 is a plan, and Fig. 11 a side view of one of the tie-bars of the cage.

In Figs. 1 and 2, the hub $a$ is provided with a central cylindrical seat $b$ with conical seats $c$ connected to its opposite ends. The cylindrical rolls $d$ are formed with a groove $e$ at the middle of the length and the casing is formed with an annular rib-section $f$ adapted to fit the groove $e$ in each of the rolls.

The rolling members upon the conical seats are shown as tapering rolls $g$ having flat inner ends contacting with conical surfaces upon the ends of the cylindrical rolls, thus forming a purely rolling contact.

The casing is formed of annular sections to facilitate the assembling of the rolls $d$ and rolling members $g$ between the seats on the hub and casing.

In Fig. 2, a casing-section $l$ is shown at each side of the annular rib $f$, each of such side-sections having a tapering seat $l'$ to resist the end thrust on the rolling members.

The outer corners of the side-sections are rabbeted, and a shell $m$ has its opposite ends spun or bent into the rabbets after the bearing is assembled, to lock the sections firmly together.

The seats for the rolling members $g$ are expanded slightly from the outer end of the hub inwardly, and the rolling members could not therefore be inserted between the hub and casing in the space between them at the outer end, as such space is less than the largest diameter of the rolling members.

The cage is formed of annular heads $h$ with tie-bars $i$, equal in number to the rolls, connected to the heads, and provided with wings $j$ to embrace the outer sides of the rolls, as shown in Fig. 1, to guide them in their movements and to hold them in place when assembled upon the hub.

To readily form such tie-bars with wings, they are made of sheet-metal cut and stamped to the desired form, and provided at each end with a tenon $k$ which fits one of the mortises $k'$ in the heads.

To make a light cage, the heads are formed of thin sheet-metal and stamped to form lateral stiffening flanges $h'$ upon its edges.

The outer flange of each head is notched in a line with the mortises $k'$, and the tenons $k$ are made long enough to bend over upon the outer sides of the heads into the notches $h^2$, thus holding the heads securely upon the tenons; while the fitting of the tenons to the notches prevents the tie-bars from tipping or twisting in the mortises.

The construction of this roller bearing is designed to lock the parts permanently together and not to provide for any separation of the parts after they are put into use. Such locking is effected by the cage and by the shell $m$, as will be understood by the following description.

For assembling the parts, the cage is prepared by connecting the tie-bars to one of the heads only, and it is then placed within the annular rib $f$, and the rolls $d$ and one set of the rolling members $g$ are inserted successively from the inner side of the cage between the wings $j$, the groove in each roll $d$ being fitted to the rib $f$.

The hub can then be inserted within the rolls already adjusted, and the other set of rolling members $g$ introduced into the open end of the cage by slightly bending the free ends of the tie-bars outwardly.

After the introduction of these rolling members, the remaining cage-head is applied to the tie-bars and secured by bending the tenons, as already described. The cage then serves, by means of the wings $j$, to hold all of the rolls and rolling members upon the hub, which requires merely an outer casing to complete the bearing.

The casing-sections $l$ are then applied over opposite ends of the hub, and the shell $m$ fitted over the casing-sections, and its ends spun into the rabbets upon the section-corners.

One end of the shell may be spun or flanged inwardly in advance, so that only the remaining end needs to be spun into the rabbet after the bearing is all assembled.

The construction of Fig. 3 differs from that already described, in the use of balls $g'$ instead of tapering rolls for the rolling members at opposite ends of the cylindrical rolls. The operation is just the same with the balls.

The bearing differs also in having an annular rib $f'$ upon the hub instead of upon the casing, thus enabling the casing to be formed of two parts only, marked $l^2$.

The method of assembling the parts is, for this construction, similar to that already described.

As the rib $f'$ is upon the hub it can only be inserted within the rolls previously inserted in the cage, by springing the tie-bars $i$ of the cage outwardly to crowd the rolls over the rib $f'$ as the hub is inserted.

When the hub is in place, the final rolling members $g'$ are inserted in the open end of the cage, and the head $h$ is then secured upon the ends of the tie-bars, as shown at one side of Fig. 3.

With either construction, the application of the casing-sections $l$ or $l^2$ and the fitting of the shell $m$ over the same secures all the parts of the bearing permanently in their working position.

The bearing is well adapted to resist lateral and end strain, and all its parts are of cheap construction, and with hardened rolls, such as are commonly used, the bearing is very durable and efficient.

Having thus set forth the nature of the invention what is claimed herein is:

1. In a double thrust roller bearing, the combination, with a hub having a cylindrical seat with conical seats connected to its opposite ends, of cylindrical rolls fitted to the cylindrical seat and having means to prevent longitudinal movement of these rolls, rolling members bearing upon the conical seats and contacting with the opposite ends of the cylindrical rolls, and a casing having cylindrical and conical seats fitted to the outer sides of the rolls and the rolling members.

2. In a double thrust roller bearing, the combination, with a hub having a cylindrical seat with conical seats connected to its opposite ends, of cylindrical rolls fitted to the cylindrical seat and having means to prevent longitudinal movement of these rolls, rolling members bearing upon the conical seats and contacting with the opposite ends of the cylindrical rolls, and a casing having two annular sections with their outer portions fitted to the tapering rolls and their inner portions fitted to the opposite end portions of the cylindrical rolls, to facilitate the assembling of the rolls with the hub and casing.

3. In a double thrust roller bearing, the combination, with a hub having a cylindrical seat with conical seats connected to its opposite ends, of cylindrical rolls fitted to the cylindrical seat and having each a groove intermediate to its ends, tapering rolls bearing upon the conical seats and contacting with the opposite ends of the cylindrical rolls, and a casing having a middle section formed to engage the groove in each cylindrical roll, and having two outer sections fitted to opposite sides of the middle section and furnished with seats to bear upon the cylindrical roll and upon the tapering rolls.

4. In a double thrust roller bearing, the combination, with a hub having a cylindrical seat with conical seats connected to its opposite ends, of cylindrical rolls fitted to the cylindrical seat and having means to prevent longitudinal movement of these rolls, rolling members bearing upon the conical seats and contacting with the opposite ends of the cylindrical rolls, a casing formed in annular sections fitted to the outer sides of the rolls and rolling members, and a shell embracing the exterior of the casing and overlapped upon its ends to retain all the parts in their working relation.

5. In a double thrust roller bearing, the combination, with a hub having a cylindrical seat with conical seats connected to its opposite ends, of cylindrical rolls fitted to the cylindrical seat, rolling members bearing upon the conical seats and contacting with the opposite ends of the cylindrical rolls, a casing fitted to the exteriors of the rolls and rolling members, and the cylindrical rolls having each a groove intermediate to its ends and means projected from at least one of the bearing seats of the rolls for engaging the groove in each roll and preventing longitudinal movement.

6. In a double thrust roller bearing, the combination, with a hub having a cylindrical seat with conical seats connected to its opposite ends, of cylindrical rolls fitted to the cylindrical seat and having means to prevent longitudinal movement of these rolls, rolling members bearing upon the conical seats and contacting with the opposite ends of the cylindrical rolls, a casing fitted to the exteriors of the rolls and rolling members, cage-heads fitted to the outer sides of the rolling members, and sheet-metal bars having their ends secured in the heads and their edges bent into wings embracing the opposite sides of the rolls to retain them upon the hub and guide them within the casing.

7. In a double thrust roller bearing, the combination, with a hub having a cylindrical seat with conical seats connected to its opposite ends, of cylindrical rolls fitted to the cylindrical seat and having means to prevent longitudinal movement of these rolls, rolling members bearing upon the conical seats and contacting with the opposite ends of the cylindrical rolls, a casing fitted to the exteriors of the rolls and rolling members, annular cage-heads having each a notched flange at its outer edge and mortises in line with such notches, and tie-bars having tenons extending through the mortises and bent into the said notches and provided with wings fitted to the opposite sides of the rolls.

In testimony whereof I have hereunto set my hand.

CHARLES S. LOCKWOOD.